(12) United States Patent
DeMont (10) Patent No.: US 6,173,403 B1
(45) Date of Patent: *Jan. 9, 2001

(54) METHOD AND APPARATUS FOR DISTRIBUTING INFORMATION PRODUCTS

(75) Inventor: Jason Paul DeMont, Basking Ridge, NJ (US)

(73) Assignee: Achates Reference Publishing, Inc., Basking Ridge, NJ (US)

( * ) Notice: Under 35 U.S.C. 154(b), the term of this patent shall be extended for 0 days.

This patent is subject to a terminal disclaimer.

(21) Appl. No.: 09/288,012

(22) Filed: Apr. 8, 1999

Related U.S. Application Data (63) Continuation-in-part of application No. 08/845,805, filed on Apr. 30, 1997.

(51) Int. Cl.[7] .................................................. H04K 1/00
(52) U.S. Cl. ..................... 713/185; 380/283; 713/193; 705/51; 705/52; 705/55; 705/59; 705/66; 705/67
(58) Field of Search ................. 380/283; 705/51, 705/52, 55, 59, 66, 67; 713/185, 193

(56) References Cited

U.S. PATENT DOCUMENTS

| | | | |
|---|---|---|---|
| 4,683,968 | 8/1987 | Appelbaum et al. . | |
| 4,757,534 | * 7/1988 | Matyas et al. ........................ | 380/25 |
| 4,845,715 | 7/1989 | Francisco . | |
| 4,847,902 | * 7/1989 | Hampson ................................ | 380/4 |
| 4,864,494 | * 9/1989 | Kobus, Jr. ............................ | 364/200 |
| 5,010,571 | * 4/1991 | Katznelson ............................ | 380/4 |
| 5,103,476 | 4/1992 | Waite et al. . | |
| 5,138,712 | * 8/1992 | Corbin .................................. | 395/700 |
| 5,204,897 | * 4/1993 | Wyman .................................. | 380/4 |
| 5,222,134 | 6/1993 | Waite et al. . | |
| 5,260,999 | * 11/1993 | Wyman .................................. | 384/4 |
| 5,287,408 | * 2/1994 | Samson ................................. | 380/4 |
| 5,319,705 | * 6/1994 | Halter et al. ......................... | 380/4 |
| 5,337,357 | 8/1994 | Chou et al. . | |
| 5,343,526 | 8/1994 | Lassers . | |
| 5,392,351 | * 2/1995 | Hasebe et al. ........................ | 380/4 |
| 5,490,216 | 2/1996 | Richardson . | |
| 5,553,139 | 9/1996 | Ross et al. . | |
| 5,579,222 | 11/1996 | Bains et al. . | |
| 5,625,690 | 4/1997 | Michel et al. . | |
| 5,636,277 | 6/1997 | Nagahama . | |
| 5,666,411 | 9/1997 | McCarty . | |
| 5,745,879 | * 4/1998 | Wyman .................................. | 705/1 |
| 5,751,805 | 5/1998 | Otsuki et al. . | |
| 5,758,069 | 5/1998 | Olsen . | |
| 5,818,933 | * 10/1998 | Kambe et al. ........................ | 380/4 |

* cited by examiner

Primary Examiner—Tod R. Swann
Assistant Examiner—Paul E. Callahan

(57) ABSTRACT

A method and apparatus for distributing information products is described that comprises: receiving an encrypted launch code; decrypting the encrypted launch code with a string, R, as the key to recover a first candidate authentication code and an indicium of a first information product; and installing the first information product onto the computer when the candidate authorization code matches a first known authorization code.

19 Claims, 4 Drawing Sheets

METHOD AND APPARATUS FOR DISTRIBUTING INFORMATION PRODUCTS

CROSS-REFERENCE TO RELATED APPLICATIONS

This application is a continuation-in-part of U.S. patent application Ser. No. 08/845,805, filed Apr. 30, 1997, which application is incorporated by reference.

FIELD OF THE INVENTION

The present invention relates to a method and apparatus for distributing information products in general, and, more particularly, to a method and apparatus for distributing and installing computer programs and data.

BACKGROUND OF THE INVENTION

For as long as publishers have been distributing information products, piracy has been a concern. For the purposes of this specification the term "information product" includes, but is not limited to, computer software, data, images, music, applets, photographs, animations, video, audio, text, hypertext and multimedia works.

As a practical matter, large-scale piracy committed by professional thieves is easy for publishers to detect and police because of the inherently commercial and public aspects of large-scale piracy. Small-scale piracy committed by individuals who, for example, purchase one copy of a computer program and install it on three or four computers in a small office is more insidious and, in the aggregate, economically more harmful to publishers.

Several techniques have been used by publishers of information products to impede piracy. When music was first distributed on CDs, CD duplicating equipment were expensive and rare and publishers implicitly relied on "physical security" to impede small-scale copyright infringers. The theory underlying physical security is that the difficulty in duplicating the media containing the information product is sufficient to stop most small-scale infringement.

When it is difficult for the end-user to duplicate the media, or to transfer the information product from one computer to another over a network, the publisher can be reasonably assured that widespread piracy is not occurring. Of course, the end-user could lend, lease or sell the media embodying the information product to another who would install it, and physical security could not prevent it.

When the technology for duplicating the media embodying an information product becomes ubiquitous, or it becomes easy to copy the information product from one computer to another over a network, publishers often employ "cryptographic security" to thwart copyright infringers.

According to one technique, the installer accompanying the software will not install the software on the end-user's computer until an acceptable password is entered by the end-user at the time of installation. The password is received by the end-user from the publisher after the end-user registers with the publisher and the publisher is assured that the end-user has paid for the software. Although this technique is widely used, it suffers from the weakness that the end-user can use the media and password again to install the software on another computer. Furthermore, the end-user can post the password publicly on an electronic bulletin-board and the advantage of the secret password are lost.

SUMMARY OF THE INVENTION

Some embodiments of the present invention are capable of distributing information products without many of the costs and restrictions associated with techniques in the prior art. In particular, some embodiments of the present invention are capable of distributing one or more information products together (e.g., on a physical medium, electronically over a network, etc.) while reserving to the publisher the ability to control which products are actually installed on an end-user's computer.

An illustrative embodiment of the present invention comprises: receiving an encrypted launch code; decrypting the encrypted launch code with a string, R, as the key to recover a first candidate authentication code and an indicium of a first information product; and installing the first information product onto the computer when the candidate authorization code matches a first known authorization code.

DETAILED DESCRIPTION

The illustrative embodiment of the present invention facilitates the distribution of a plurality of information products by a publisher in such a manner that each product can be licensed, installed and used independently or in combination with other information products. Advantageously, this is accomplished, in part, through the use of a program commonly known as an "installer." As is well known to those skilled in the art, an installer is a program that is prepared by the publisher of an information product, that is distributed along with the information product, and that controls the installation of the information product onto the end-user's computer. Although the installer runs on the end-user's computer, it acts as a remote agent of the publisher to control how and under what circumstances the information products are installed on the end-user's computer.

Each information product associated with the illustrative embodiment constitutes a plurality of hypertext files or "web pages" that are accessed by the end-user through a browser such as Netscape Navigator or Internet Explorer. Although each information product comprises hypertext files, the files are not intended to be accessed by the end-user via the Internet. Instead, all of the information products are advantageously distributed together on a single medium (e.g., a CD-ROM, etc.) or electronically (e.g., via the Internet, etc.) and are installed on the end-user's computer, or on an intranet server associated with the end-user. It will be clear to those skilled in the art how to use a browser such as Netscape Navigator or Internet Explorer to browse through web pages that are stored locally in contrast to using the browser to browse web pages that are stored on http servers across the Internet.

One example of an information product that can be used with embodiments of the present invention comprises a plurality of web pages that constitute some of the legislative, administrative and judicial materials associated with patent law. Another example of an information product that can be used with embodiments of the present invention comprises a plurality of web pages that constitute some of the legislative, administrative and judicial materials associated with trademark law. And yet another example of an information product that can be used with embodiments of the present invention comprises a plurality of web pages that constitute some of the legislative, administrative and judicial materials associated with copyright law.

Information products that work with embodiments of the present invention need not relate to law, or reference materials, or even text. Other information products could comprise music, video, multimedia, or data or other executables. It will be clear to those skilled in the art how to make and use embodiments of the present invention that are associated with information products that comprise other than hypertext files.

Each information product associated with the illustrative embodiment constitutes a single issue of a periodical to which an end-user can subscribe and receive monthly updates. It will be clear to those skilled in the art that other embodiments of the present invention can be used to distribute a single information product. It will also be clear to those skilled in the art that other embodiments of the present invention can be used to distribute one or more information products that are not part of a serialization or that are part of a serialization that issues sporadically, in contrast to periodically.

Figure 1:
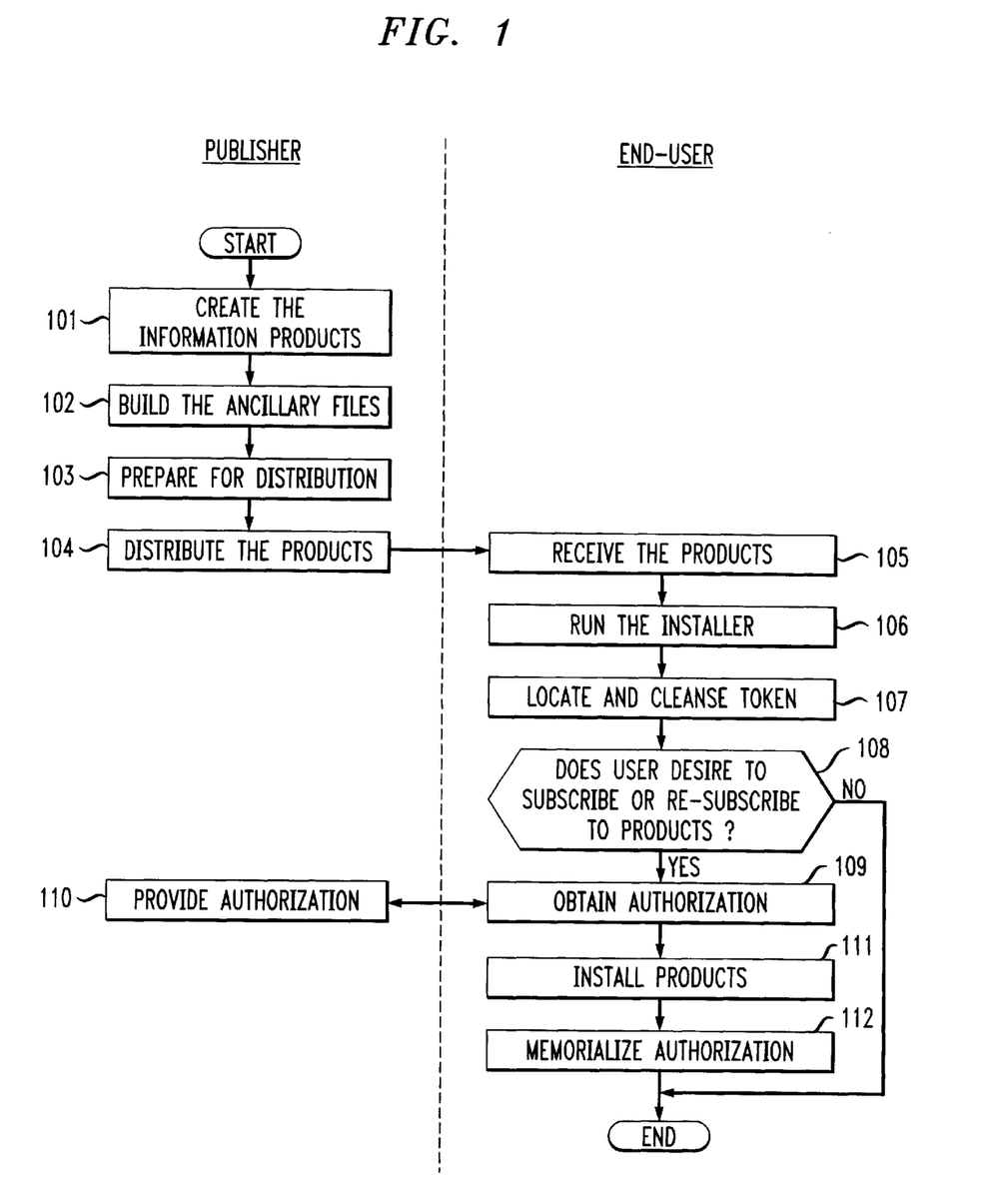
FIG. 1 depicts a flowchart of the steps associated with distributing information products in accordance with the illustrative embodiment of the present invention.

FIG. 1 depicts a flowchart that outlines the steps associated with distributing information products in accordance with the illustrative embodiment of the present invention I. Create The Information Products In accordance with step 101, each information product is created by the publisher. To assist in describing the illustrative embodiment, three information products are created whose subject matter is related. For the purposes of this specification, the three products are named "Patent Law Library," "Trademark Law Library" and "Copyright Law Library." It will be clear to those skilled in the art how to make and use embodiments of the present invention when a different number of products are created, or when their subject matter is not related, or both.

For the purposes of the illustrative embodiment, the Patent Law Library is a set of files that contain Title 35 of the United States Code as marked-up in the Hypertext Markup Language ("HTML"); the Trademark Law Library is a set of files that contain the Lanham Act as marked-up in HTML, and the Copyright Law Library is a set of files that contain Title 17 of the United States Code as marked-up in HTML. The files in each information product are advantageously viewed on an end-user's computer through a browser such as Netscape Navigator or Internet Explorer.

Although all three products are advantageously distributed together, any one, two or all three of the products can be installed into an end-user's computer. In other words, in accordance with the illustrative embodiment, one end-user can install just the Patent Law Library although another user installs both the Patent Law Library and Copyright Law Library.

Because of the perishable nature of the subject matter of each of the illustrative products, the Patent Law Library, Trademark Law Library and Copyright Law Library are each a single issue of a periodical, which issues monthly.

Each product advantageously comprises one or more files within one or more directories in a hierarchical file structure. When a product contains a large number of files, it is usually advantageous to arrange the files in multiple directories. It will be clear to those skilled in the art how to determine when a specific information product should contain multiple directories. For pedagogical reasons, the files within each of the three illustrative information products are contained within one of three sub-directories, which have a common root directory.

Some or all of the files in the illustrative information products advantageously contain hypertext links to items in other files. For example, the reference in 35 U.S.C. 42(c) to section 31 of the Lanham Act can be implemented as a hypertext link from the file containing 35 U.S.C. 42(c) in the Patent Law Library to the file containing section 31 in the Trademark Law Library.

It will be clear to those skilled in the art that files associated with other embodiments of the present invention can contain, for example, executable programs, data and/or references to other files, which target files may be in the same or other products. It will also be clear to those skilled in the art that information products associated with other embodiments of the present invention need not contain references to other files. It will be clear to those skilled in the art how to create the files in each information product.

All of the files in all of the information products are advantageously created and arranged in a file structure with the knowledge of the name and location in the file structure of each file it is capable of referencing, regardless of whether the files are part of the same information product or not.

The Patent Law Library comprises five files in the hierarchical file structure shown in Table 1. The Trademark Law Library comprises three files in the hierarchical file structure shown in Table 2, and the Copyright Law Library comprises four files in the hierarchical file structure shown in Table 3. Advantageously, all three products are designed to install into the same hierarchical directory space, relative to whatever the end-user defines, during installation, as the root directory for the product(s).

TABLE 1

The files that compose the Patent Law Library.

| File | Location |
|---|---|
| File 1 | \directory1\file1.htm |
| File 2 | \directory1\file2.htm |
| File 3 | \directory1\file3.htm |
| File 4 | \directory1\file4.htm |
| File 5 | \directory1\file5.htm |

TABLE 2

The files that compose the Trademark Law Library.

| File | Location |
|---|---|
| File 6 | \directory2\file6.htm |
| File 7 | \directory2\file7.htm |
| File 8 | \directory2\file8.htm |

TABLE 3

The files that compose the copyright Law Library.

| File | Location |
|---|---|
| File 9 | \directory3\file9.htm |
| File 10 | \directory3\file10.htm |
| File 11 | \directory3\file11.htm |
| File 12 | \directory3\file12.htm |

For pedagogical reasons, the three information products in the illustrative embodiment comprise a total of 12 files. In commercial applications, it will be clear to those skilled in the art that a single information product can comprise hundreds or thousands of files. It will be clear to those skilled in the art how to make and use the files that compose the three information products.

The books *HTML Publishing for Netscape*, Stuart Harris & Gayle Kidder, Ventana Communications Group, Inc., Research Triangle Park, North Carolina, and *HTML: The Definitive Guide*, Chuck Musciano & Bill Kennedy, O'Reilly & Associates, Inc., Sebastopol, Calif., provide an excellent overview the creation of files using HTML and are incorporated by reference.

II. Build The Ancillary Files

Because (1) each file can contain a hypertext link to a target file that may not be in the same information product, and (2) the information products can be licensed and installed separately, the possibility exists that a file can be installed on a end-user's computer that contains a hypertext link to a target file that is not installed on the end-user's computer. The result is a hypertext link that, when executed, generates a run-time error because the target file is not installed on the computer.

To preclude run-time errors, the installer advantageously installs a "dummy" or "nominal" file into the end-user's computer in the same location and with the same name as each file that could be referenced but is not also installed. The nominal file advantageously does not contain the same information as the authentic file, but contains a notice that it is only a nominal file and that access to the authentic file requires the installation of another information product.

At step 102, ancillary files are built to enable the installer to know where to install the nominal files. In the illustrative embodiment, one ancillary file is built for each information product and the ancillary files indicates the name and location of each nominal file to be installed when that information product is installed.

There are two alternative techniques that can be used by the installer for installing the nominal files and the authentic files. According to the first technique, the installer installs all of the authentic files for all of the information products to be installed, and then installs all of the nominal files into those locations not containing an authentic file. According to the second technique, the installer installs all of the nominal files for all of the information products to be installed, and then installs all of the authentic files to be installed over the nominal files, perhaps overwriting over some or all of the nominal files. The choice of technique advantageously does not affect how the ancillary files are built. The installer associated with the illustrative embodiment uses the first technique, but it will be clear to those skilled in the art how to make and use embodiments of the present invention that use the second technique.

When the total number of files in all of the information products is small, each ancillary file associated with each information product can exhaustively list all of the files associated with every other information product. In contrast, when the total number of files in all of the information products is large, it is advantageous for each ancillary file to list only those files actually needed. To determine which files are needed, all of the files in all of the information products need to be examined to determine which files reference which other files.

Figure 2:
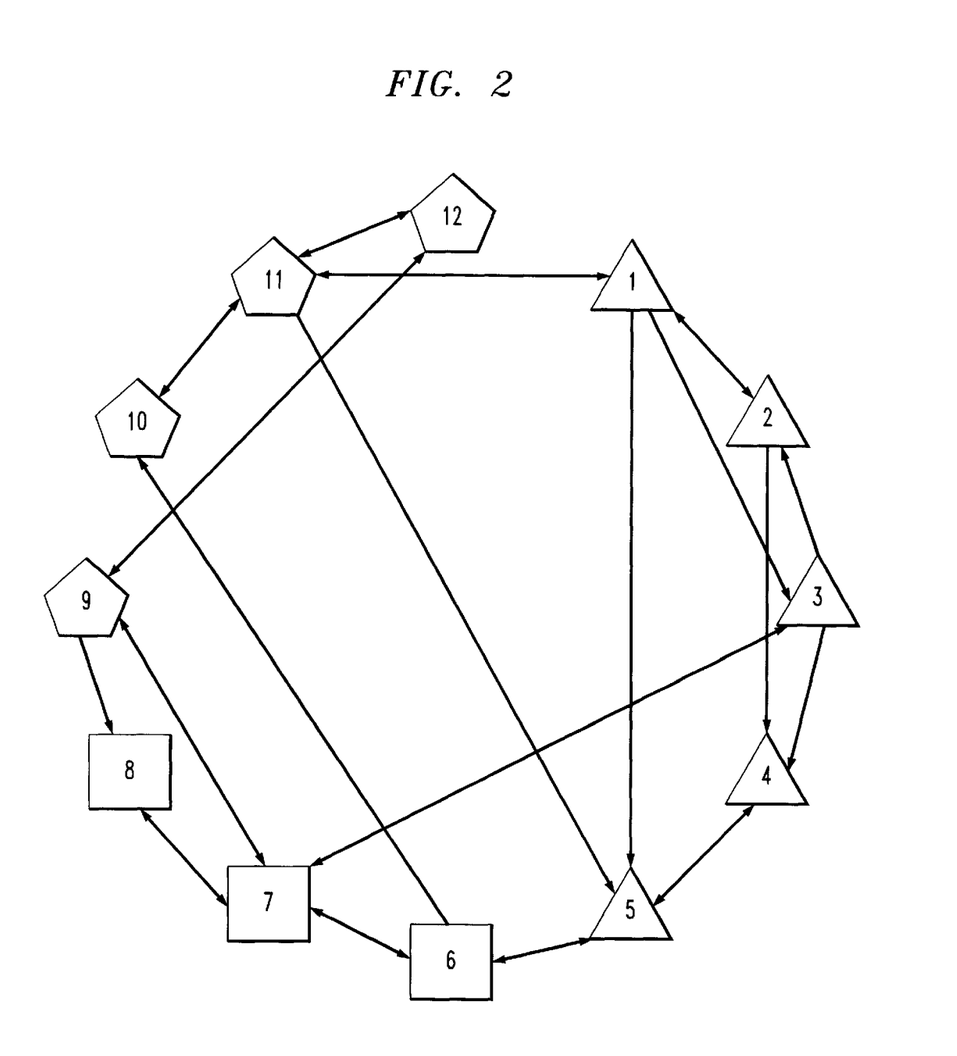
FIG. 2 depicts a directed graph that indicates which files in a group of files contain hypertext links to which other files.

FIG. 2 depicts an illustrative directed graph that represents all of the files in the three illustrative products and indicates which files contain hypertext links to other files. It will be clear to those skilled in the art how to determine the topology of the directed graph by examining all of the files in all of the products associated with an embodiment of the present invention.

Each file in each product is represented by a polygon enclosing a number. Each of the five files associated with the Patent Law Library are depicted by a triangle; each of the three files associated with the Trademark Law Library are depicted by a square and each of the four files associated with the Copyright Law Library are depicted by a pentagon. The number inside the polygon indicates exactly which file it is associated with. For example, the file "file3.htm" is depicted by a triangle enclosing the number 3.

An arrow from one polygon to another indicates that the file associated with the first polygon contains at least one hypertext link to the file associated with the second polygon. A double-ended arrow indicates that both files contain hypertext links to each other.

Table 4 provides the same information as does FIG. 2, but in tabular format. Each row in Table 4 represents a file in one of the three products, and an "X" in a box means that the file associated with the row contains a hypertext link to the file associated with that column. Like the directed graph in FIG. 2, the entries in Table 4 are illustrative only. It will be clear to those skilled in the art how to make a similar table by examining all of the files in all of the information products associated with an embodiment of the present invention.

Although both the directed graph of FIG. 2 and Table 4 illustrate a tendency for files within an information product to reference other files within the same product, there are occurrence of files within one product containing references to files in other products.

TABLE 4

Which Files Externally Reference Which Files

| | 1 | 2 | 3 | 4 | 5 | 6 | 7 | 8 | 9 | 10 | 11 | 12 |
|---|---|---|---|---|---|---|---|---|---|---|---|---|
| 1 | | X | X | | X | | | | | | X | |
| 2 | X | | | X | | | | | | | | |
| 3 | | X | | X | | | X | | | | | |
| 4 | | | | | X | | | | | | | |
| 5 | | | | X | | X | | | | | | |
| 6 | | | | | X | | X | | | X | | |
| 7 | | | X | | | X | | X | X | | | |
| 8 | | | | | | | X | | | | | |
| 9 | | | | | | | X | X | | | | X |
| 10 | | | | | | | | | | X | | |
| 11 | X | | | | X | | | | | X | | X |
| 12 | | | | | | | | | | X | X | |

As both FIG. 2 and Table 4 indicate, there are three files (File 6, File 7 and File 11) not within the Patent Law Library that are referenced by files within Patent Law Library. Therefore, the Patent Law Library's ancillary file is built as shown in Table 5. Whenever the Patent Law Library is installed, the files listed in the ancillary file are advantageously also installed as nominal files.

TABLE 5

Ancillary File associated with the Patent Law Library

Ancillary File

\directory2\file6.htm
\directory2\file7.htm
\directory3\file11.htm

As both FIG. 2 and Table 4 indicate, there are four files (File 3, File 5, File 9 and File 10) not within the Trademark Law Library that are referenced by files within Trademark Law Library. Therefore, the Trademark Law Library's ancillary file is built as shown in Table 6. Whenever the Trademark Law Library is installed, the files listed in the ancillary file are advantageously also installed as nominal files.

TABLE 6

Ancillary File associated with the Trademark Law Library

Ancillary file

\directory1\file3.htm
\directory1\file5.htm
\directory3\file9.htm
\directory3\file10.htm As both FIG. 2 and Table 4 indicate, there are four files (File 1, File 5, File 7 and File 8) not within the Copyright Law Library that are referenced by files within Copyright Law Library. Therefore, the Copyright Law Library's ancillary file is built as shown in Table 7. Whenever the Copyright Law Library is installed, the files listed in the ancillary file are advantageously also installed as nominal files.

TABLE 7

Ancillary File associated with the Copyright Law Library

Ancillary file

\directory1\file1.htm
\directory1\file5.htm
\directory2\file7.htm
\directory2\file8.htm III. Prepare For Distribution Referring again to step 103 in FIG. 1, when each information product and its associated ancillary file are built, the files are advantageously prepared for distribution. Because all of the information products are advantageously distributed on the same medium (e.g., CD-ROM, DVD, diskette) or distributed electronically over a wide-area-network (e.g., the Internet), each information product is advantageously compressed with a lossless compression technique and encrypted, in well-known fashion, with the string, S, as the key.

The purpose of the compression is to reduce the amount of bandwidth each information product consumes during distribution and to reduce the entropy of the information products before encryption. The purpose of encryption is to enable the distribution of the information products without allowing unauthorized access to the information products after the information products have left the publisher's possession. In other words, the encryption allows the publisher to give a potential end-user a CD-ROM that contains all of information products but to retain control of the end-user's access to the information products. The installer advantageously knows the cryptosystem and key for decrypting each of the information products. How the publisher grants access to the information products after they have left his or her control will be described in detail below.

It will be clear to those skilled in the art how to prepare the information products and ancillary files for distribution.

IV. Distribute the Information Products

At step 104, the information products and ancillary files and the accompanying installer and its associated files are distributed on a single medium (e.g., a CD-ROM, DVD, etc.), on multiple media (e.g., diskettes, etc.) and/or electronically over a network (e.g., the Internet, etc.). It will be clear to those skilled in the art how to distribute the information products.

V. Receive the Information Products

At step 105, the information products and ancillary files and the accompanying installer and its associated files are received by the end-user.

VI. Run the Installer

At step 106, the end-user initiates the installation process. When the information products are distributed on one or more media, the end-user inserts the media into his or her computer and runs the installer in well-known fashion. When the information products are distributed electronically over a network, the end-user collects the files on his or her computer and then runs the installer in well-known fashion.

VI. Locate and Cleanse the Token

At step 107, the installer advantageously checks to determine if the publisher has previously granted authorization to install one or more of the information products on the end-user's computer. The installer determines if the publisher has previously granted authorization by searching for a token on the end-user's computer, which token would have been placed there by an earlier edition of the installer from the publisher.

When an end-user obtains a subscription to one or more of the information products, the installer memorializes the authorization during the length of the subscription. This is advantageous because it relieves the publisher and the end-user from having to obtain explicit authorization for each issue during the length of the subscription.

The token can be conceptualized as a secret, authenticated message from one installer to a subsequent installer that indicates to the subsequent installer that the end-user's computer is granted access to certain of the information products for a given duration. How the token is created and placed on the end-user's computer will be described in detail below.

Advantageously, the token is a file with a name and location that are known to the installer. The token advantageously comprises a data structure comprising:

(1) an authentication code;
(2) an indicium of the name of the end-user;
(3) a list of the information products to which the end-user has been granted access; and
(4) an indicium of when the authorization for each information product expires.

Furthermore, the token file is encrypted so as to impede an end-user from illicitly obtaining access to an information product by doctoring the token. The encryption is performed, in well-known fashion, and the installer advantageously knows the both the cryptosystem and the key, T, for decrypting the token. Table 8 depicts the contents of the illustrative token.

TABLE 8

Contents of the Illustrative token

Authentication code
Indicium of End-User's Identity
Information Product No. 1; Expiration Date
Information Product No. 2; Expiration Date The authentication code is advantageously a 32-bit or longer string that is known to the installer and publisher and is not generally known to the public.

The indicium of the name of the user can either be the actual name of the end-user or a code that represents the name of the end-user. When a user illicitly attempts to share the token with others or to post it on a bulletin board or the Internet, it indelibly bears an indicium of the name of the person to whom it was originally given. If the publisher sees the token posted publicly, the publisher can decrypt the token, learn the identity of the user to whom the token was given and then investigate whether that user is inducing copyright infringement of the publisher's information products.

The list of information products to which the end-user has been authorized access can either list the products to which access has been authorized, or, alternatively, can list of all of the information products published and an indicium of whether access has been authorized or not for each product.

The indicium of when the access for each information product expires is advantageously based on the information products' version numbers rather than on calendar dates. Each edition of the installer is told what is the version number of the information products that accompany it.

Figure 3:
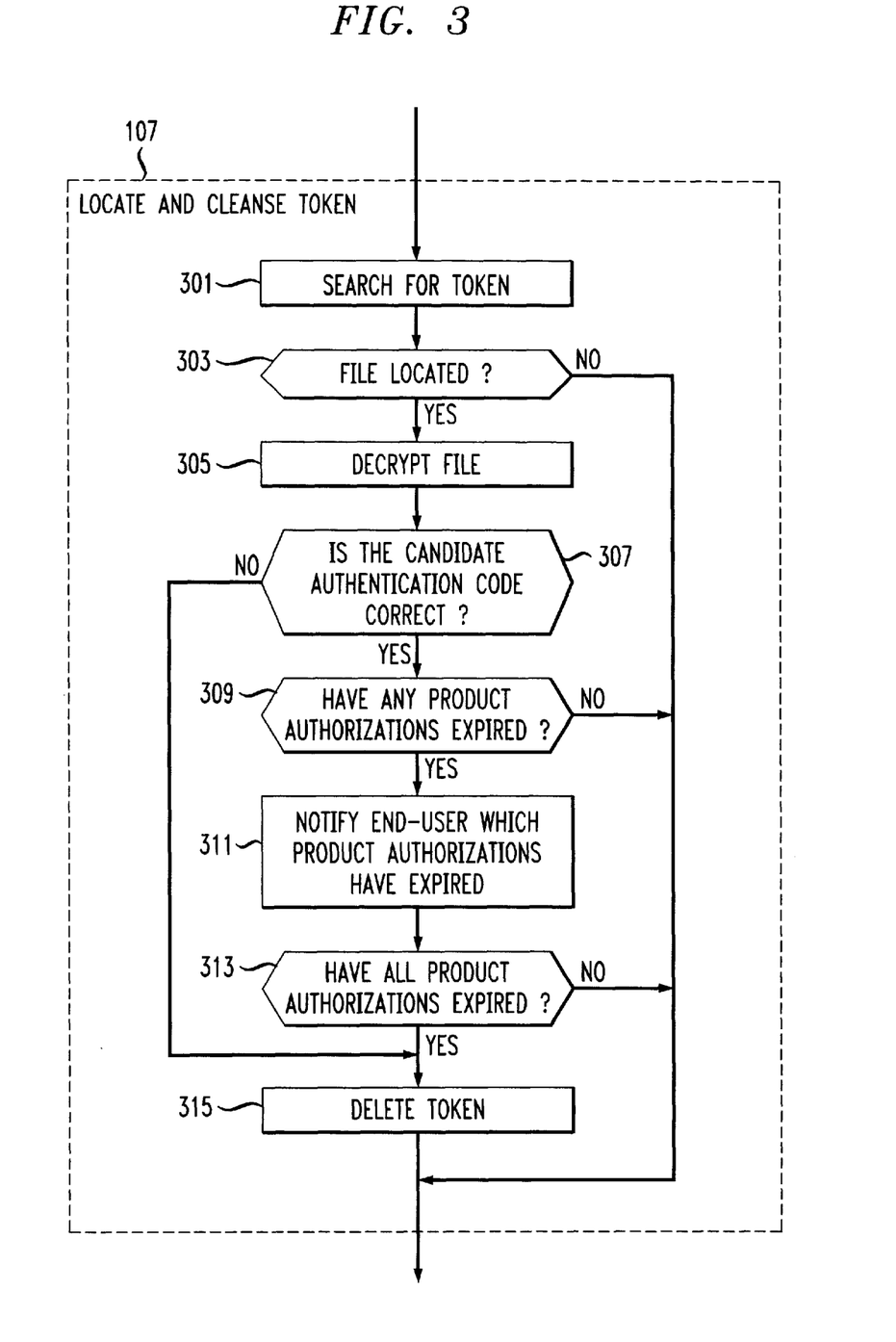
FIG. 3 depicts a flowchart of the detailed steps associated with the step of locating and cleansing the token in FIG. 1.

FIG. 3 depicts a flowchart of the illustrative steps conducted by the installer in locating and cleansing the token, which is step 107 in FIG. 1. At step 301, the installer searches the end-user's computer for a file with the same name as the token and in the same location as expected. At step 303, if the installer locates a file with the same name as the token and in the same location as expected, then control passes to step 305, else the installer infers that authorization was not previously given. At step 305, the installer decrypts the found file, in well-known fashion, according to the cryptosystem and the key it knows. At step 307, the installer attempts to locate the candidate authentication code in the decrypted file and compares the candidate authentication code with the known authentication code, which the installer knows. If the installer determines that the candidate authentication code matches the known authentication code, the installer infers that the token is genuine and has not been doctored and control passes to step 309; else the installer infers than authorization was not previously given or the token was doctored and control passes to step 315. As a practical matter, a mismatched authentication code is likely to be the result of an end-user trying to gain unauthorized access to the information products by tinkering with the token.

At step 309, the installer determines if the any of the information products' authorizations have expired. If the any of the information products' authorizations have expired, then control passes to step 311. At step 311, the installer notifies the end-user which information products' authorizations have expired, and then control passes to step 313. At step 313, the installer determines if all of the information products' authorizations have expired, and if they have, control passes to step 315. At step 315, the installer deletes the token.

VII. Subscribe or Re-Subscribe?

Referring to step 108 in FIG. 1, the end-user is queried by the installer whether the end-user desires to subscribe to new information products or to re-subscribe to information products whose subscriptions have expired. If the end-user indicates "No," then the installer stops and the process ends. Otherwise, control passes to step 109.

VIII. Obtain Authorization

At step 109 the end-user seeks authorization to subscribe or re-subscribe to one or more information products. Because the various information products are encrypted, it is difficult for the end-user to access the information products unilaterally and without the installer's cooperation. The end-user acquires the installer's cooperation to decrypt and install the respective information products by entering into the installer a "password" or "launch code," which is chosen from a large number of possibilities so that probabilistically it is unlikely that the end-user can guess it. Advantageously, the publisher only provides the launch code to the end-user after the publisher is satisfied that the end-user has paid for access to the desired information products.

Figure 4:
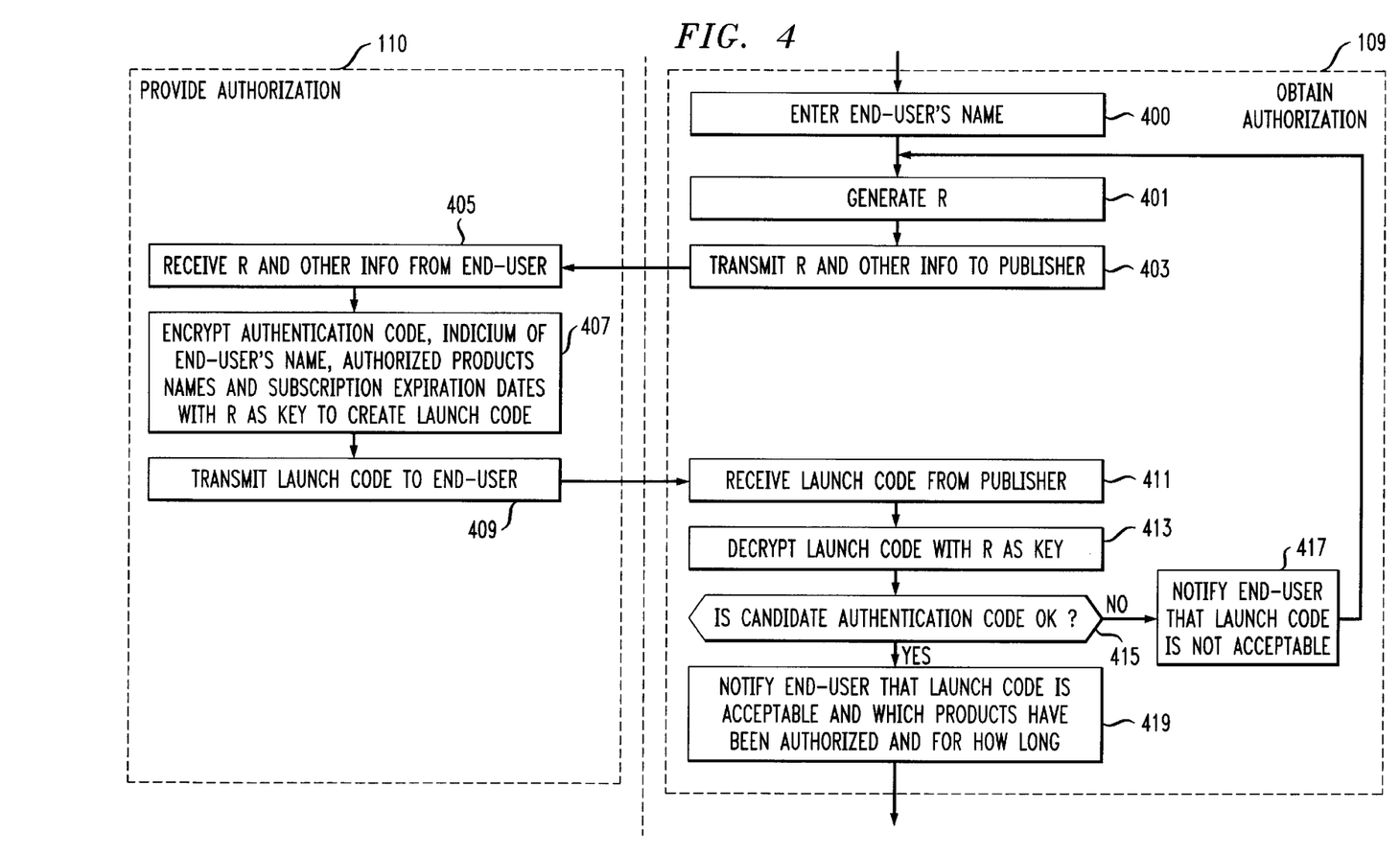
FIG. 4 depicts a flowchart of the detailed steps associated with the steps of providing authorization and obtaining information in FIG. 1.

FIG. 4 depicts a flowchart of the steps involved in the illustrative embodiment for obtaining and providing authorization to begin a subscription. First, at step 400 the installer advantageously requires that the end-user enter all or a portion of his or her name. At step 401, the installer then generates and notifies the end-user of a 32-bit or longer "serial number," R, that is advantageously based on a random number generated by the installer. The serial number can also be based, in part, on the end-user's name, as input at step 400. It is advantageous that the end-user not be able to control what serial number is generated, nor that the same serial number be generated each time step 401 is encountered.

At step 403, the end-user then advantageously contacts the publisher via the telephone or the Internet and provides to the publisher:

(1) the end-user's name and address;
(2) the end-user's credit card information or other method of payment;
(3) the name of the information products that the end-user desires to subscribe to and for what duration; and
(4) the serial number, R, generated by the installer at step 401.

When the publisher is satisfied that he or she will be paid for the subscription, the publisher creates the launch code by encrypting a data structure comprising:

(1) an authentication code;
(2) an indicium of the name of the end-user;
(3) a list of the information products to which the end-user has been granted access; and
(4) an indicium of when the authorization for each information product expires in a cryptosystem known to the installer using R as the key. Advantageously, only the publisher and the installer know the cryptosystem used for encrypting and decrypting the launch code. It will be clear to those skilled in the art how to create the launch code. At steps 409 and 411, the publisher transmits the launch code to the end-user, who enters the launch code into the installer.

At step 413, the installer decrypts the launch code with R as the key. At step 415, the installer recovers the candidate authentication code from the decrypted launch code and determines if the candidate authentication code matches the authentication code known to the installer. When the authentication code matches, the installer infers that the launch code is authentic and control passes to step 419. When the authentication code does not match, the installer infers that the launch code has been corrupted or doctored, and control passes to step 417. At step 417 the end-user is notified by the installer that the launch code is not accepted and control passes to step 401.

At step 419, the installer notifies the end-user that the launch code is accepted and also advantageously notifies the end-user that subscriptions for what product have been authorized and for what duration.

The purpose of generating a new serial number, R, each time the installer requires a launch code is to prevent the end-user from using a single launch code to install the information products on multiple computers. The purpose of encrypting the data structure at step 407 is to impede an end-user from manipulating the parameters in the data structure to get more than was paid for.

The purpose of putting an indicium of the end-user's identity into the launch code is identical to the reason the indicium of the end-user's identity was put into the token. That is, if an end-user shares the launch code with others or to post it on a bulletin board or the Internet, it indelibly bears the name of the person to whom it was originally given. If the publisher sees the launch code posted publicly, the publisher can decrypt the launch code, learn the identity of the user to whom the launch code was given and then investigate whether that end-user is inducing copyright infringement of the publisher's information products. Because the publisher may not know what value of R was used to encrypt that particular launch code, the existence of the known authentication code in the plaintext provides the publisher with information to make a known-plaintext cryptanalytic attack on the launch code.

IX. Install the Products

At step 111 in FIG. 1, the installer installs all of the information products that have been authorized by the publisher to be installed. This includes both the information products whose authorization was given previously in the token, and the information products whose authorization was obtained in step 109.

Advantageously, the installer decrypts the authorized information products and installs them on the end-user's computer in well-known fashion. Then the installer uses the ancillary file associated with each installed information product to install the nominal files, if any, on the end-user's computer, as described above.

X. Memorialize the Authentication

At step 112 in FIG. 1, the installer memorializes the authorization of the various information products by updating the token located in step 107, if necessary, with the new authorizations, if any, obtained in step 109. The revised token is then advantageously encrypted with a cryptosystem and a key, T, that will be known to later editions of the installer. The encrypted token is then stored on the end-user's computer with a name and in location to be known by later editions of the installer.

What is claimed is:

1. A method comprising:
    receiving an encrypted launch code;
    decrypting said encrypted launch code with a string, R, as the key to recover a first candidate authentication code and an indicium of a first information product; and
    installing said first information product onto said computer when said candidate authorization code matches a first known authorization code.

2. The method of claim 1 further comprising:
    decrypting said encrypted launch code with said string, R, as the key to recover an indicium of a second information product; and
    installing said second information product onto said computer when said first candidate authorization code matches said first known authorization code.

3. The method of claim 1 further comprising:
    decrypting said encrypted launch code with said string, R, as the key to recover an indicium of when the authorization for said first information product expires; and
    installing said first information product onto said computer when said first candidate authorization code matches said first known authorization code and said indicium of when the authorization for said first information product expires has not expired.

4. The method of claim 1 further comprising:
    creating a token comprising a second known authentication code and said indicium of said first information product;
    encrypting said token with a string, T, to create an encrypted token; and
    storing said encrypted token on said computer.

5. The method of claim 4 wherein said token further comprises an indicium of a second information product.

6. The method of claim 4 wherein said token further comprises an indicium of when the authorization for said first information product expires.

7. The method of claim 4 wherein said token further comprises an indicium of the end-user to whom said encrypted launch code is provided.

8. The method of claim 4 wherein said first known authentication code and said second known authentication code are the same and said string R and said string T are the same.

9. The method of claim 4 further comprising:
    reading said encrypted token from said computer;
    recovering from said encrypted token with said string, T, to recover a second candidate authentication code and said indicium of a first information product; and
    installing said first information product onto said computer when said second candidate authorization code matches said second known authorization code.

10. The method of claim 9 further comprising:
    recovering from said encrypted token an indicium of when the authorization for said first information product expires; and
    installing said first information product onto said computer when said second candidate authorization code matches said second known authorization code and said indicium of when the authorization for said first information product expires has not expired.

11. The method of claim 5 further comprising:
    recovering from said token an indicium of a second information product and an indicium of when the authorization for said second information product expires; and
    installing said second information product onto said computer when said second candidate authorization code matches said second known authorization code and said indicium of when the authorization for said second information product expires has not expired.

12. The method of claim 11 wherein said indicium of when the authorization for said first information product expires and said indicium of when the authorization for said second information product expires are the same.

13. The method of claim 1 further comprising installing at least one nominal file for a second information product onto said computer.

14. A method comprising:
    reading an encrypted token from a computer;
    decrypting said encrypted token with a string, T, as the key to recover an indicium of a first information product;
    installing said first information product onto said computer; and
    installing at least one nominal file for a second information product onto said computer.

15. The method of claim 14 further comprising:
    recovering from said encrypted token with said string, T, as the key to recover an indicium of a second information product; and
    installing said second information product onto said computer.

16. The method of claim 14 further comprising:

recovering from said encrypted token with said string, T, as the key to recover an indicium of when the authorization for said first information product expires; and installing said first information product onto said computer when said indicium of when the authorization for said first information product expires has not expired.

17. A method comprising:

reading an encrypted token from a computer;

decrypting said encrypted token with a string, T, as the key to recover a token that comprises an indicium of a first information product;

modifying said token to comprise an indicium of a second information product;

encrypting said token with said string, T, as the key to create a newly encrypted token; and storing said newly encrypted token on said computer.

18. The method of claim 17 further comprising modifying said token to comprise an indicium of when the authorization for said second information product expires.

19. The method of claim 17 wherein said token comprises an indicium of an end-user.

\* \* \* \* \*

(12) INTER PARTES REVIEW CERTIFICATE (122nd)
United States Patent
Demont (10) Number: US 6,173,403 K1
(45) Certificate Issued: Apr. 21, 2016

(54) METHOD AND APPARATUS FOR DISTRIBUTING INFORMATION PRODUCTS (75) Inventor: Jason Paul Demont (73) Assignee: ACHATES REFERENCE PUBLISHING, INC.

Trial Number:
IPR2013-00080 filed Dec. 14, 2012

Petitioner: Apple Inc.

Patent Owner: Achates Reference Publishing, Inc.

Inter Partes Review Certificate for:
Patent No.: 6,173,403
Issued: Jan. 9, 2001
Appl. No.: 09/288,012
Filed: Apr. 8, 1999

The results of IPR2013-00080 are reflected in this inter partes review certificate under 35 U.S.C. 318(b).

INTER PARTES REVIEW CERTIFICATE
U.S. Patent 6,173,403 K1
Trial No. IPR2013-00080
Certificate Issued Apr. 21, 2016

AS A RESULT OF THE INTER PARTES REVIEW PROCEEDING, IT HAS BEEN DETERMINED THAT:

Claims 1-12 and 17-19 are cancelled.

* * * * *